(12) United States Patent
Gruber et al.

(10) Patent No.: US 8,542,286 B2
(45) Date of Patent: *Sep. 24, 2013

(54) LARGE FORMAT DIGITAL CAMERA WITH MULTIPLE OPTICAL SYSTEMS AND DETECTOR ARRAYS

(75) Inventors: Michael Gruber, Graz (AT); Martin Josef Ponticelli, Graz (AT)

(73) Assignee: Microsoft Corporation, Redmond, WA (US)

( * ) Notice: Subject to any disclaimer, the term of this patent is extended or adjusted under 35 U.S.C. 154(b) by 492 days.

This patent is subject to a terminal disclaimer.

(21) Appl. No.: 12/624,454

(22) Filed: Nov. 24, 2009

(65) Prior Publication Data

US 2011/0122300 A1 May 26, 2011

(51) Int. Cl.
*H04N 5/225* (2006.01)

(52) U.S. Cl.
USPC ......................................... 348/218.1; 348/144

(58) Field of Classification Search
USPC .............. 348/14.01–14.16, 36–39, 143–161, 348/207.99, 218.1, 222.1, 262, 700; 396/7–13, 396/72, 322, 325, 335–340, 436; 382/284, 382/294; 352/69–71; 345/660; 8/405
See application file for complete search history.

(56) References Cited

U.S. PATENT DOCUMENTS

| | | | |
|---|---|---|---|
| 4,978,983 A | 12/1990 | St. Alfors | |
| 5,757,423 A * | 5/1998 | Tanaka et al. | 348/218.1 |
| 6,104,840 A | 8/2000 | Ejiri et al. | |
| 6,172,349 B1 | 1/2001 | Katz et al. | |
| 6,370,337 B1 | 4/2002 | Stephenson | |
| 6,512,857 B1 | 1/2003 | Hsu et al. | |
| 6,535,650 B1 | 3/2003 | Poulo et al. | |
| 6,549,215 B2 * | 4/2003 | Jouppi | 345/660 |
| 6,694,064 B1 | 2/2004 | Benkelman | |
| 6,757,445 B1 | 6/2004 | Knopp | |
| 7,006,111 B1 | 2/2006 | Rothrock | |

(Continued)

FOREIGN PATENT DOCUMENTS

| | | |
|---|---|---|
| WO | WO 98/36318 | 8/1998 |
| WO | WO 2005/075248 | 8/2005 |
| WO | WO 2006/050430 | 5/2006 |

OTHER PUBLICATIONS

Maas et al., "The accuracy potential of large format still video cameras," Videometrics V, SPIE Proceedings Series vol. 3174, SPIE's 42nd Annual Meeting, San Diego, 1997.*

(Continued)

*Primary Examiner* — Nelson D. Hernández Hernández
*Assistant Examiner* — Dennis Hogue
(74) *Attorney, Agent, or Firm* — Hope Baldauff, LLC

(57) ABSTRACT

A large format digital camera has a primary camera system configured for collecting panchromatic image data and a secondary camera system configured for collecting color image data. The secondary camera system has an optical system that has a longer focal length than the optical system of the primary camera system. The resolution of the secondary camera system is greater than the resolution of the primary camera system. The footprint of images produced by the primary camera system is larger in size than the footprint of images produced by the secondary camera system. Images produced by the primary camera system offer information for performing image-based georeferencing by means of photogrammetric triangulation. Images produced by the secondary camera system offer a high-resolution narrow angle color image suitable for use in ortho image production.

19 Claims, 6 Drawing Sheets

(56) References Cited

U.S. PATENT DOCUMENTS

| | | | |
|---|---|---|---|
| 7,009,638 B2 | 3/2006 | Gruber | |
| 7,215,364 B2 | 5/2007 | Wachtel et al. | |
| 7,305,180 B2 | 12/2007 | Labaziewicz et al. | |
| 7,339,614 B2 | 3/2008 | Gruber et al. | |
| 7,363,157 B1 | 4/2008 | Hanna et al. | |
| 7,796,174 B1 | 9/2010 | Harwit et al. | |
| 2002/0152557 A1* | 10/2002 | Elberbaum | 8/405 |
| 2002/0163582 A1 | 11/2002 | Gruber et al. | |
| 2003/0138247 A1* | 7/2003 | Trunz et al. | 396/325 |
| 2006/0215038 A1* | 9/2006 | Gruber et al. | 348/218.1 |
| 2006/0275025 A1* | 12/2006 | Labaziewicz et al. | 396/72 |
| 2007/0025595 A1 | 2/2007 | Koizumi et al. | |
| 2007/0030396 A1* | 2/2007 | Zhou et al. | 348/700 |
| 2007/0268533 A1 | 11/2007 | Kijima et al. | |
| 2008/0024390 A1 | 1/2008 | Baker et al. | |
| 2008/0030592 A1 | 2/2008 | Border et al. | |
| 2008/0030611 A1 | 2/2008 | Jenkins | |
| 2008/0204570 A1 | 8/2008 | Schultz et al. | |
| 2008/0211941 A1 | 9/2008 | Deever et al. | |
| 2008/0218612 A1 | 9/2008 | Border et al. | |
| 2008/0231700 A1 | 9/2008 | Schultz et al. | |
| 2008/0297587 A1* | 12/2008 | Kurtz et al. | 348/14.08 |
| 2009/0040323 A1 | 2/2009 | Leberl et al. | |
| 2009/0041368 A1 | 2/2009 | Leberl et al. | |
| 2009/0096884 A1 | 4/2009 | Schultz et al. | |
| 2009/0154793 A1 | 6/2009 | Shin et al. | |
| 2009/0202148 A1 | 8/2009 | Eisen | |
| 2009/0256909 A1 | 10/2009 | Nixon | |
| 2009/0295907 A1 | 12/2009 | Kim et al. | |
| 2010/0110209 A1* | 5/2010 | Border et al. | 348/222.1 |
| 2011/0122223 A1 | 5/2011 | Gruber et al. | |
| 2011/0211109 A1 | 9/2011 | Compton et al. | |

OTHER PUBLICATIONS

Schroth, R.W. et al., "Trends in Digital Photogrammetry from an International Enterprise Perspective," 2008, The International Archives of the Photogrammertry, Remote Sensing and Spatial Information Sciences, vol. 37, Part B2, pp. 1093-1098.

Trinder, John, "Characteristics of New Generation of Digital Ariel Cameras," downloaded Jul. 30, 2009 from http://www.gisdevelopment.net/technology/ap/ap001pf.htm, 4 pages.

Williams, Bob, "Feature: Small Large Coexist," May 2009, Professional Surveyor Magazine, 3 pages.

Gruber, Michael, "ASPRS 2009 Spring Conference and Trade Show", Mar. 9-13, 2009, pp. 8.

International Search Report dated Jul. 29, 2011 in International Application No. PCT/US2010/057695.

Ameri et al., "High Resolution Digital Surface Model (DSM) Generation Using Multi-View Multi-Frame Digital Airborne Images," 2002, Symposium of Geospatial Theory, Processing, and Applications, Ottawa, Canada, 6 pages.

U.S. Official Action dated Oct. 25, 2012 in U.S. Appl. No. 12/624,412.

International Search Report dated Aug. 9, 2011 in International Application No. PCT/US2010/057692.

U.S. Official Action dated Jun. 20, 2013 in U.S. Appl. No. 12/624,412.

European Search Report dated Jun. 13, 2013 in European Application No. 10833830.2.

* cited by examiner

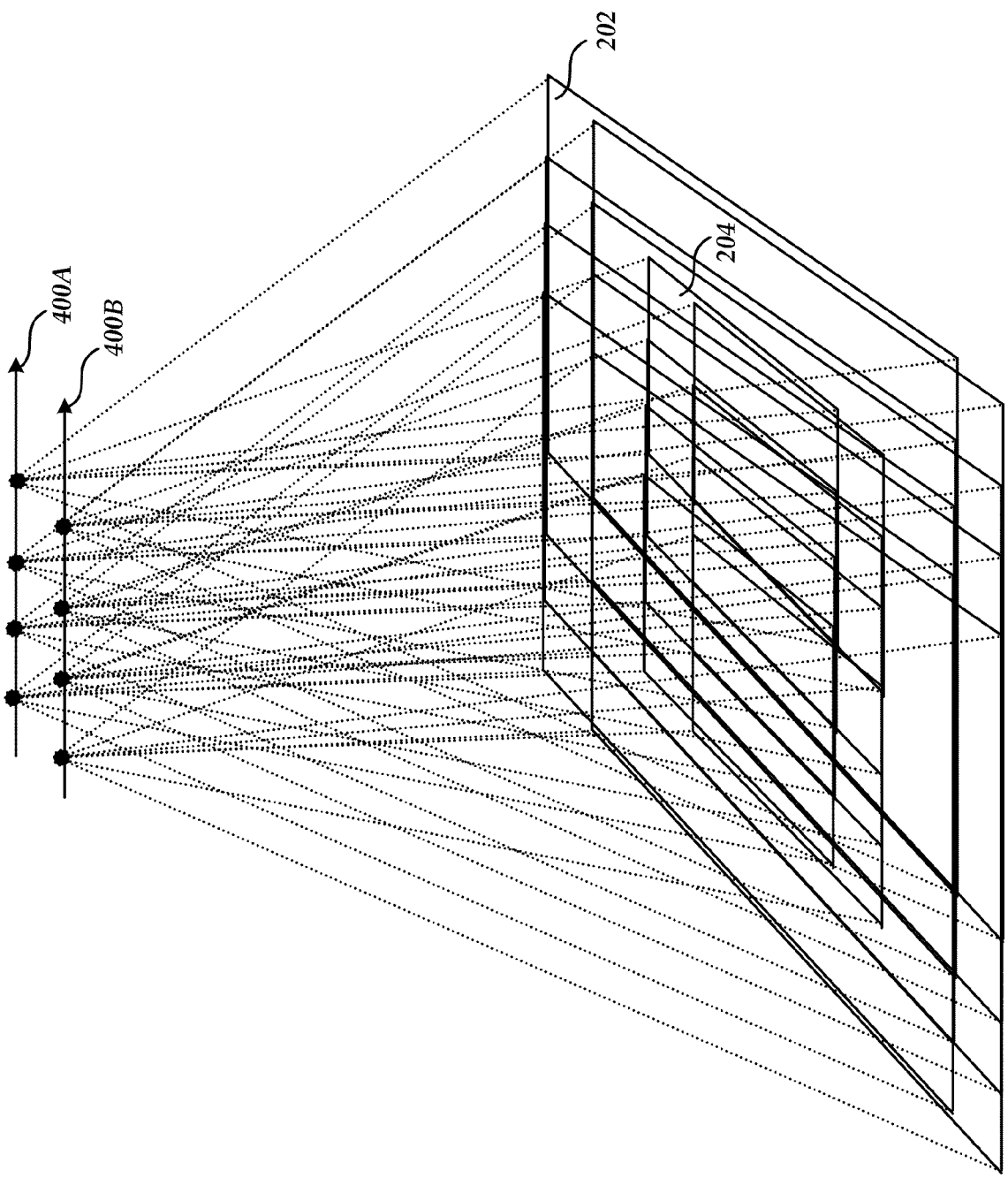

LARGE FORMAT DIGITAL CAMERA WITH MULTIPLE OPTICAL SYSTEMS AND DETECTOR ARRAYS

BACKGROUND

Traditional methods and camera systems utilized for the optical airborne registration (photogrammetric mapping) of urban areas have typically suffered from several problems. For instance, the aviation regulations near urban airports typically do not allow aircraft to fly at altitudes low enough for achieving acceptable image scales using conventional camera systems. As another example, images generated by conventional airborne camera systems typically suffer from perspective foreshortening, which causes buildings to appear as if they are leaning. This is particularly problematic in urban areas that often have many tall buildings.

It is with respect to these and other considerations that the disclosure made herein is presented.

SUMMARY

Concepts and technologies are described herein for a large format digital camera having multiple optical systems and detector arrays. Through an implementation of the concepts and technologies presented herein, a large format digital camera having multiple optical systems and detector arrays is provided that is suitable for use in the airborne optical registration of urban areas. In particular, a large format digital camera is disclosed herein that is capable of producing images at different photographic scales. The large format digital camera presented herein can produce panchromatic images using a wide-angle geometry that are suitable for use in a photogrammetric workflow that includes image-based georeferencing and digital surface modeling. The large format digital camera disclosed herein can also produce color images using a narrow-angle geometry suitable for use in a photogrammetric workflow that includes ortho image production. An ortho image is an image that shows ground objects in an orthographic projection.

According to one aspect presented herein, a large format camera is provided that includes a primary camera system, which may be referred to herein as the "first camera system," and a secondary camera system, which may be referred to herein as the "second camera system." The primary camera system is configured for collecting panchromatic image data and the secondary camera system is configured for collecting color image data. The secondary camera system has an optical system that has a longer focal length than the optical system of the primary camera system. The primary camera system and the secondary camera system may be mounted within a common housing suitable for installation and use within an aircraft.

According to other aspects, the primary camera system has an electro optical detector array capable of capturing the panchromatic image data. The secondary camera system has an electro optical detector array capable of capturing the color image data. The resolution of the electro optical detector in the secondary camera system is greater than the resolution of the electro optical detector in the primary camera system. According to other aspects, the radiometric resolution of the secondary camera system may be greater than the radiometric resolution of the primary camera system.

According to other aspects, the primary camera system and the secondary camera system are configured such that the large format digital camera can produce images at two different image scales offering two different footprints. Images produced by the primary camera system have a larger footprint and are larger in size than those produced by the secondary camera system and offer information for performing image-based georeferencing by means of photogrammetric triangulation. Images produced by the secondary camera system have a smaller footprint and are smaller in size than those produced by the primary camera system and offer a high-resolution narrow angle color image. The color images produced by the secondary camera system may be utilized as a source data set for high-resolution ortho image production. The footprint of the secondary camera system may be configured to cover the center of the footprint of the primary camera system.

According to other aspects, the large format digital camera may be configured to generate a sequence of consecutive images along a flight line. The large format camera may be further configured such that the primary camera system produces a sequence of consecutive panchromatic images that overlap one another. The secondary camera system may be configured to produce a sequence of consecutive color images that overlap one another and the images produced by the primary camera system. The overlap between consecutive panchromatic images may be greater than the overlap between consecutive color images.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4B is a perspective diagram illustrating the overlap between the footprint of a sequence of consecutive images taken on several flight lines with a primary camera system and the footprint of a sequence of consecutive images taken with a secondary camera system in a large format digital camera presented one embodiment disclosed herein.

DETAILED DESCRIPTION

Figure 1:
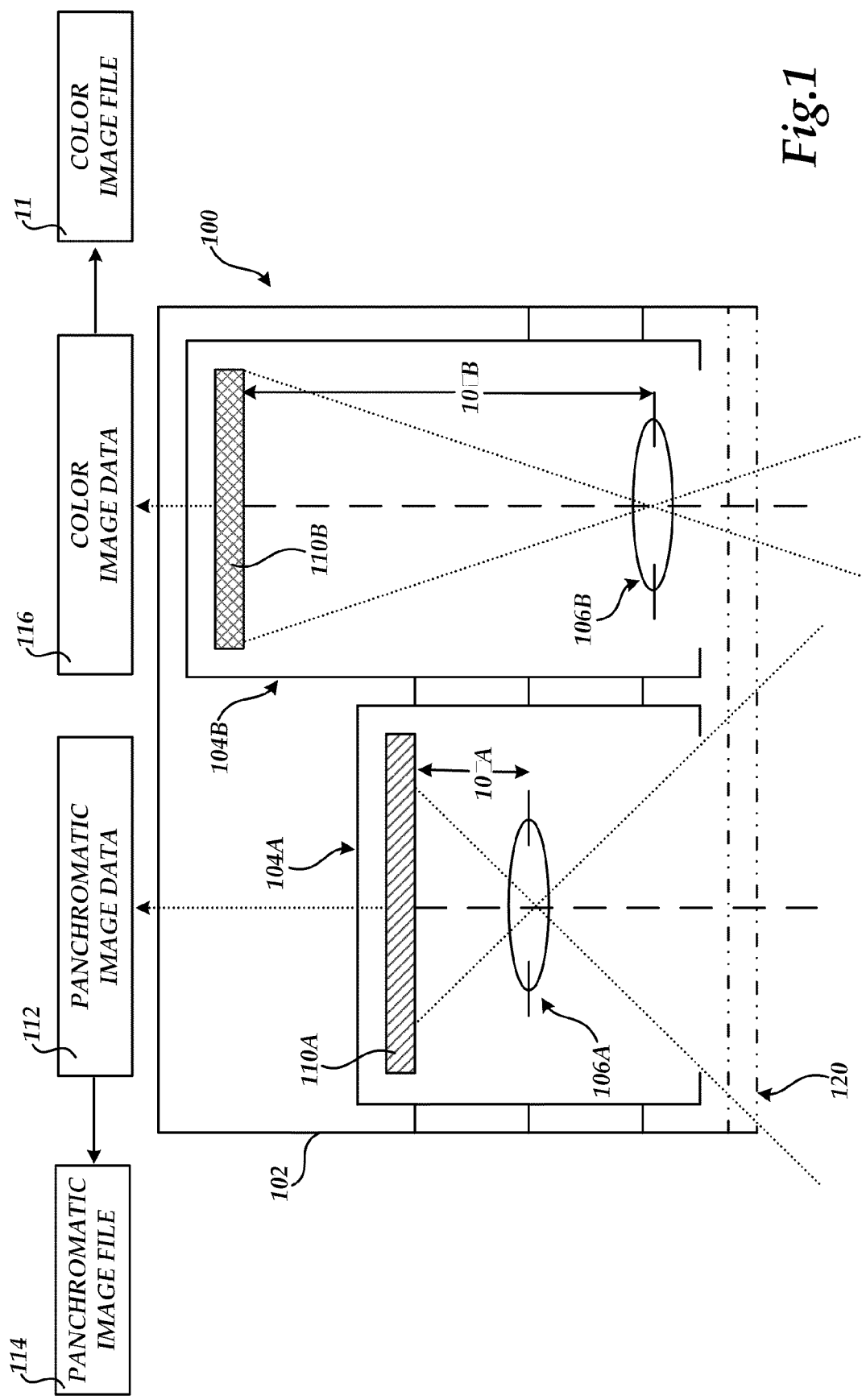
FIG. 1 is a schematic diagram showing aspects of a large format digital camera having multiple optical systems and detector arrays provided in one embodiment presented herein.

The following detailed description is directed to a large format digital camera having multiple optical systems and detector arrays. In the following detailed description, references are made to the accompanying drawings that form a part hereof, and which are shown by way of illustration specific embodiments or examples. Referring now to the drawings, in which like numerals represent like elements throughout the several figures, aspects of a large format digital camera having multiple optical systems and detector arrays will be presented.

FIG. 1 is a schematic diagram showing aspects of a large format digital camera 100 having multiple optical systems 106A-106B and detector arrays 110A-110B provided in one embodiment presented herein. As shown in FIG. 1, the large format digital camera 100 includes a primary camera system 104A, which might be referred to herein as the first camera system, and a secondary camera system 104B, which might be referred to herein as the second camera system. Although FIG. 1 illustrates only one secondary camera system 104B, it should be appreciated that other embodiments might include multiple secondary camera systems 104B.

According to one embodiment, the primary camera system 104A includes an optical system 106A that has a focal length 108A. The secondary camera system 104B includes an optical system 106B that has a focal length 108B that is longer than the focal length 108A of the optical system 106A. In this manner, the secondary camera system 104B is configured to produce images having a narrower field of view than images produced by the primary camera system 104A. Images produced by the primary camera system 104A have a wider field of view than images produced by the secondary camera system 104B. The optical systems 106A-106B may include other conventional optical elements to produce a suitable image at the desired focal length.

According to one implementation, the primary camera system 104A is configured with an electro optical detector array 110A capable of capturing panchromatic image data 112. As known in the art, a panchromatic image sensor, such as the electro optical detector array 110A, is sensitive to all or most of the entire visible spectrum. According to embodiments, the secondary camera system 104B is configured with an electro optical detector array 110B capable of capturing color image data 116. For instance, the secondary camera system 104B might be equipped with a suitable charge coupled device ("CCD") array configured for capturing the color image data 116. According to embodiments, the camera system presented herein is a frame camera (also referred to as a framing camera), as opposed to a camera that utilizes push-broom sensing.

It should be appreciated that the detector arrays 110A-110B comprise arrays of individual electro-optical detectors, e.g., semiconductor devices that output an electric signal, the magnitude of which is dependent on the intensity of light energy incident on such electro-optical detector. Therefore, the signal from each electro-optical detector in the arrays 110A-110B is indicative of light energy intensity from a pixel area of the portion of the object or terrain being photographed, and the signals from all of the individual electro-optical detectors in the arrays 110A-110B are indicative of light energy intensity from all of the pixel areas of the portion of the object or terrain being photographed. Consequently, the signals from the electro-optical detectors in each of the detector arrays 110A-110B, together, are indicative of the pattern of light energy from the portion of the object being photographed, so a sub-image of the portion of the object can be produced from such signals. First, however, the signals are amplified, digitized, processed, and stored, as is well known to those of ordinary skill in the art.

The electro-optical detector arrays 110A-110B are connected electrically by suitable conductors to a control circuit (not shown), which includes at least a microprocessor, input/output circuitry, memory, and a power supply for driving the electro-optical detector arrays 110A-110B, retrieving image data from of the arrays 110A-110B, and storing the image data. Other data processing functions, for example combining images and/or performing image display functions may be accomplished within the large format digital camera 100 or by other external data processing equipment.

According to implementations, the resolution of the electro optical detector array 104B in the secondary camera system 104B is greater than the resolution of the electro optical detector array 104A in the primary camera system 104A. In this manner, the large format digital camera 110 can produce a panchromatic image file 114 from the primary camera system 104A using a wide-angle geometry that is suitable for use in a photogrammetric workflow that includes image-based georeferencing and digital surface modeling. The large format digital camera 110 can also simultaneously produce a higher-resolution color image file from the secondary camera system 104B using a narrow-angle geometry suitable for use in a photogrammetric workflow that includes ortho image production.

As described briefly above, the primary camera system 104A and the secondary camera system 104B might be mounted within a common housing 102. In this embodiment, a front glass plate 120 might be mounted within the housing 102 to protect the optical systems 106A-106B. In alternate implementations, the primary camera system 104A and the secondary camera system 104B are mounted in separate housings (not shown). In both cases, the primary camera system 104A, the secondary camera system 104B, and the housing 102 are configured for mounting and use within an aircraft.

Figure 2:
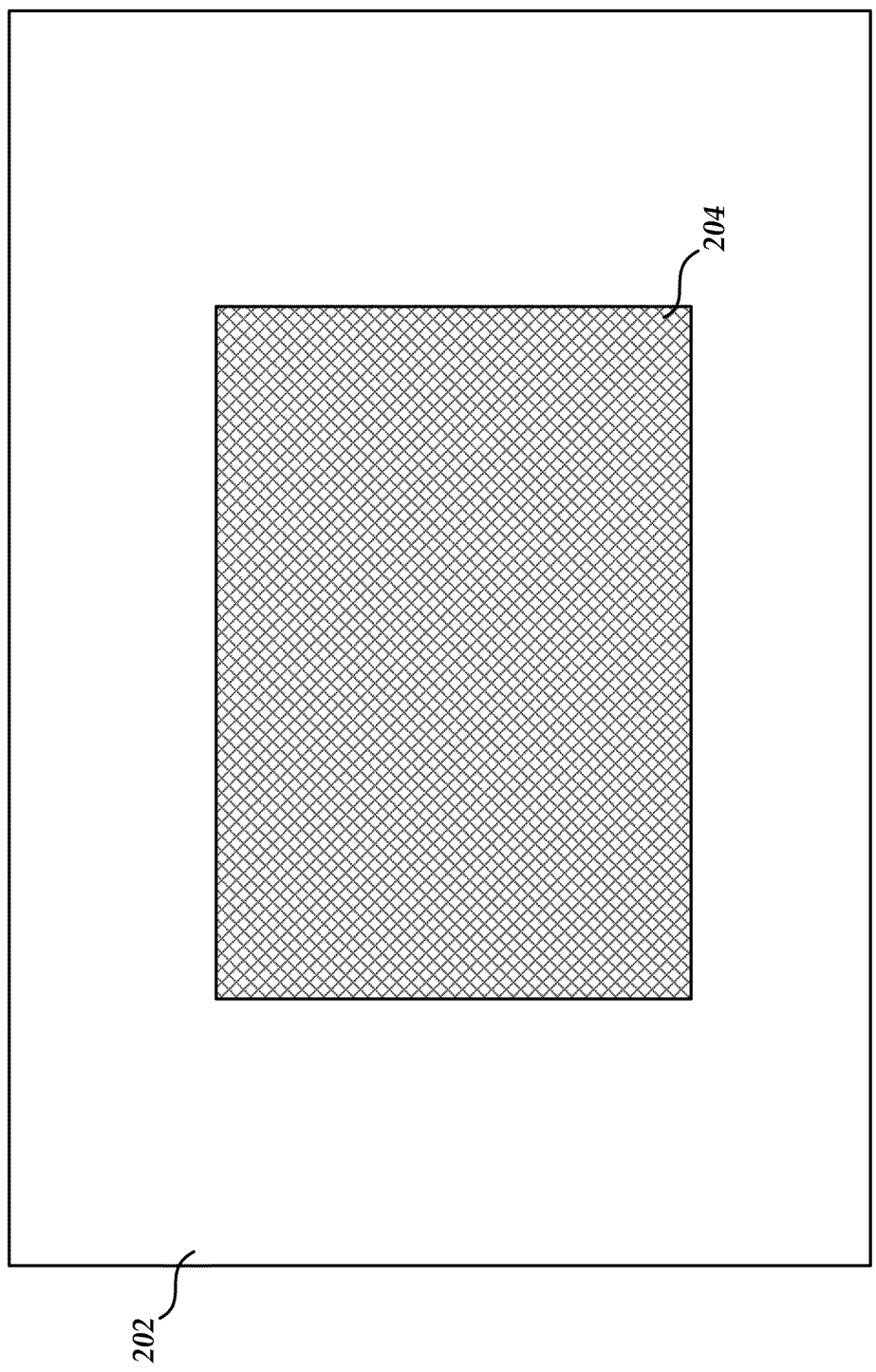
FIG. 2 is a schematic diagram showing the footprint of a primary camera system overlaid with the footprint of a secondary camera system in a large format digital camera presented in one embodiment disclosed herein.

FIG. 2 is a schematic diagram showing the footprint 202 of the primary camera system 104A overlaid with the footprint 204 of the secondary camera system 104B in the large format digital camera 100 according in one embodiment disclosed herein. As illustrated in FIG. 2, the primary camera system 104A and the secondary camera system 104B are configured in one embodiment such that the large format digital camera 100 can produce overlapping images at two different image scales offering two different footprints 202 and 204.

According to one embodiment, images produced by the primary camera system 104A have a larger footprint 202 and are larger in size than those produced by the secondary camera system 104B. Images produced by the secondary camera system 104B have a smaller footprint 204 and are smaller in size than those produced by the primary camera system 104A and offer a higher resolution narrow angle color image.

Figure 3:
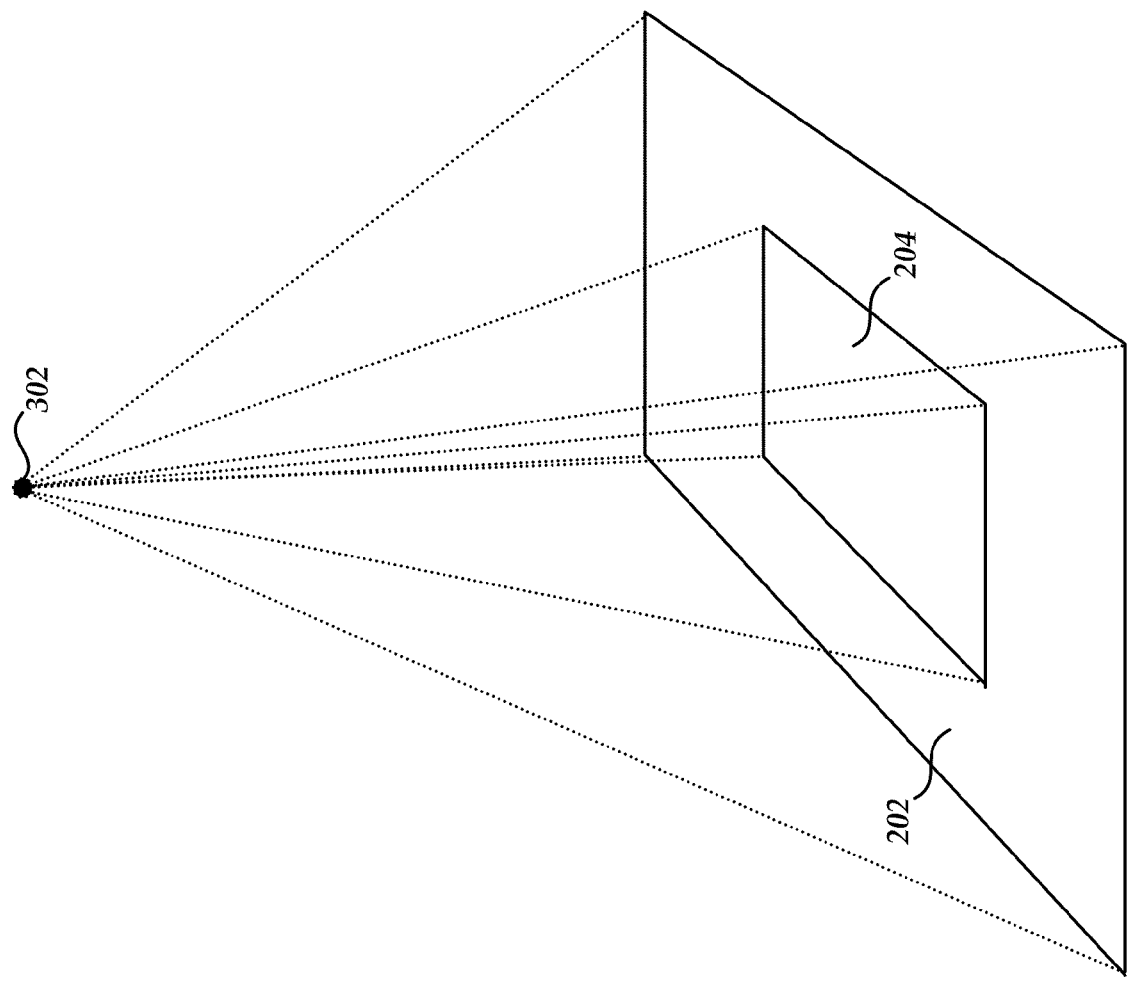
FIG. 3 is a perspective diagram showing a perspective view of the footprint of a primary camera system and the footprint of a secondary camera system in a large format digital camera presented in one embodiment disclosed herein.

As also illustrated in FIG. 2, the footprint 204 of the secondary camera system 104B may be configured to cover the center of the footprint 202 of the primary camera system 104A. By overlapping the footprints 202 and 204 in the manner shown in FIG. 2, a portion of the images produced by the primary camera system 104A can be enhanced by the images produced by the secondary camera system 104B. FIG. 3 provides a perspective view of the footprint 200 of the primary camera system 104A and the footprint 204 of the secondary camera system 104B when an image is taken from a common point 302 by both camera systems 104A-104B.

Figure 4A:
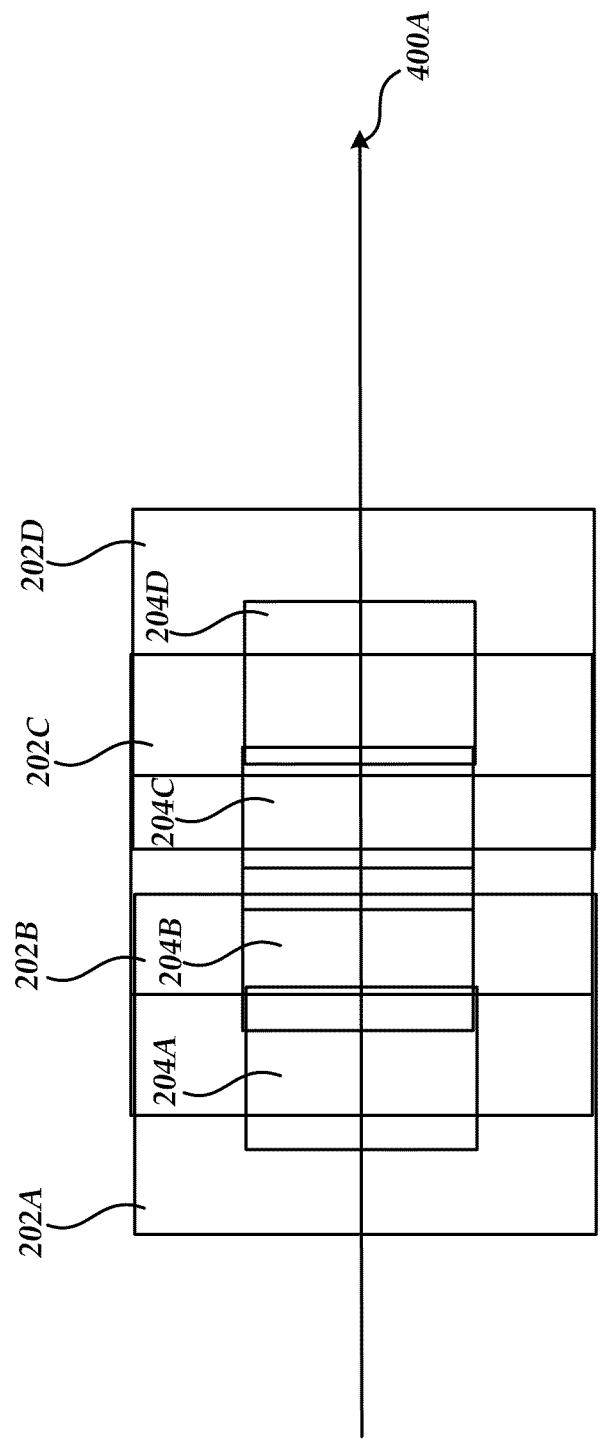
FIG. 4A is a schematic diagram illustrating the overlap between the footprint of a sequence of consecutive images taken with a primary camera system and the footprint of a sequence of consecutive images taken with a secondary camera system in a large format digital camera presented one embodiment disclosed herein.

FIG. 4A shows a top-down view that illustrates the overlap between the footprint 200 of a sequence of consecutive images taken with the primary camera system 104A and the footprint 204 of a sequence of consecutive images taken with the secondary camera system 104B in the large format digital camera 100 in one embodiment disclosed herein. As discussed briefly above, the large format digital camera 100 may be mounted and configured for use within an aircraft (not shown). When the aircraft is flown according to a well-defined flight line 400A, the large format digital camera 100 may be configured to capture a sequence of images along the flight line 400A. FIG. 4A illustrates the footprints 202A-202D of a sequence of images taken using the primary camera system 104A and the footprints 204A-204D of a sequence of images taken using the secondary camera system 104B along the flight line 400A.

As illustrated in FIG. 4A, the large format camera 100 may be further configured such that the primary camera system 104A produces a sequence of consecutive panchromatic images that have footprints 202A-202D wherein consecutive sequential images overlap one another. The secondary camera system 104B may similarly be configured to produce a sequence of consecutive color images that have footprints 204A-204D wherein consecutive sequential images overlap one another and also overlap the images produced by the primary camera system 104A. The overlap between the footprints of consecutive panchromatic images may be greater than the overlap between the footprints of consecutive color images.

FIG. 4B is a perspective diagram illustrating the overlap between the footprints 200 of a sequence of consecutive images taken on several flight lines 400A-400B with the primary camera system 104A and the footprints 204 of a sequence of consecutive images taken with a secondary camera system 104B in the large format digital camera 100 in one embodiment disclosed herein. If, as illustrated in FIG. 4B, images are produced by the primary camera system 104A and the secondary camera system 104B along multiple well-defined flight lines 400A-400B by means of aerial photogrammetric image acquisition, the footprints 202 of the primary camera system 104A overlap one another in the sequence of exposures along the flight lines 400A-400B. The footprints 204 of the secondary camera system 104B also overlap with the footprints 202 of the primary camera system 104A and the footprint 204 of the secondary camera system 104B.

Along the flight lines 400A-400B, images are therefore produced in such a way that the sequence of images produced by the primary camera system 104A and the images produced by the secondary camera system 104B create continuous image strips of overlapping images. The flight lines 400A-400B may be defined in such a way that the large format digital camera 100 captures images covering an entire project area.

According to various embodiments, image acquisition by the secondary camera system 104B may be triggered substantially simultaneously with image acquisition by the primary camera system 104A and, accordingly, images from the secondary camera system 104B may be acquired at the same position and with the same camera attitude as images from the primary camera system 104A. Alternatively, the trigger for the secondary camera system 104B may be independent from the primary camera system 104A, e.g., may be at a higher rate than images captured by the primary camera system. Either embodiment, as well as any combination thereof, is contemplated to be within the scope of embodiments presented herein.

When the primary camera system 104A and the secondary camera system 104B are triggered at the same time, the images produced by the secondary camera system 104B may be registered to the images produced by the primary camera system 104A using the same trigger event. Additionally, images produced by the secondary camera system 104B may be calibrated to images of the primary camera system 104A through the use of a precisely surveyed and well-structured object (known as a "calibration object").

The images of the secondary camera system 104B may also be stitched to the images of the primary camera system 104B using traditional methods. Additionally, the images generated by the primary camera system 104A can be used to reconstruct the three dimensional form of an object (for instance, the buildings of a city by means of a digital surface model) and the images of the secondary camera system 104B, with a higher geometric resolution, may be used to extract high resolution photo texture which can then used for the production of urban ortho image maps.

Figure 5:
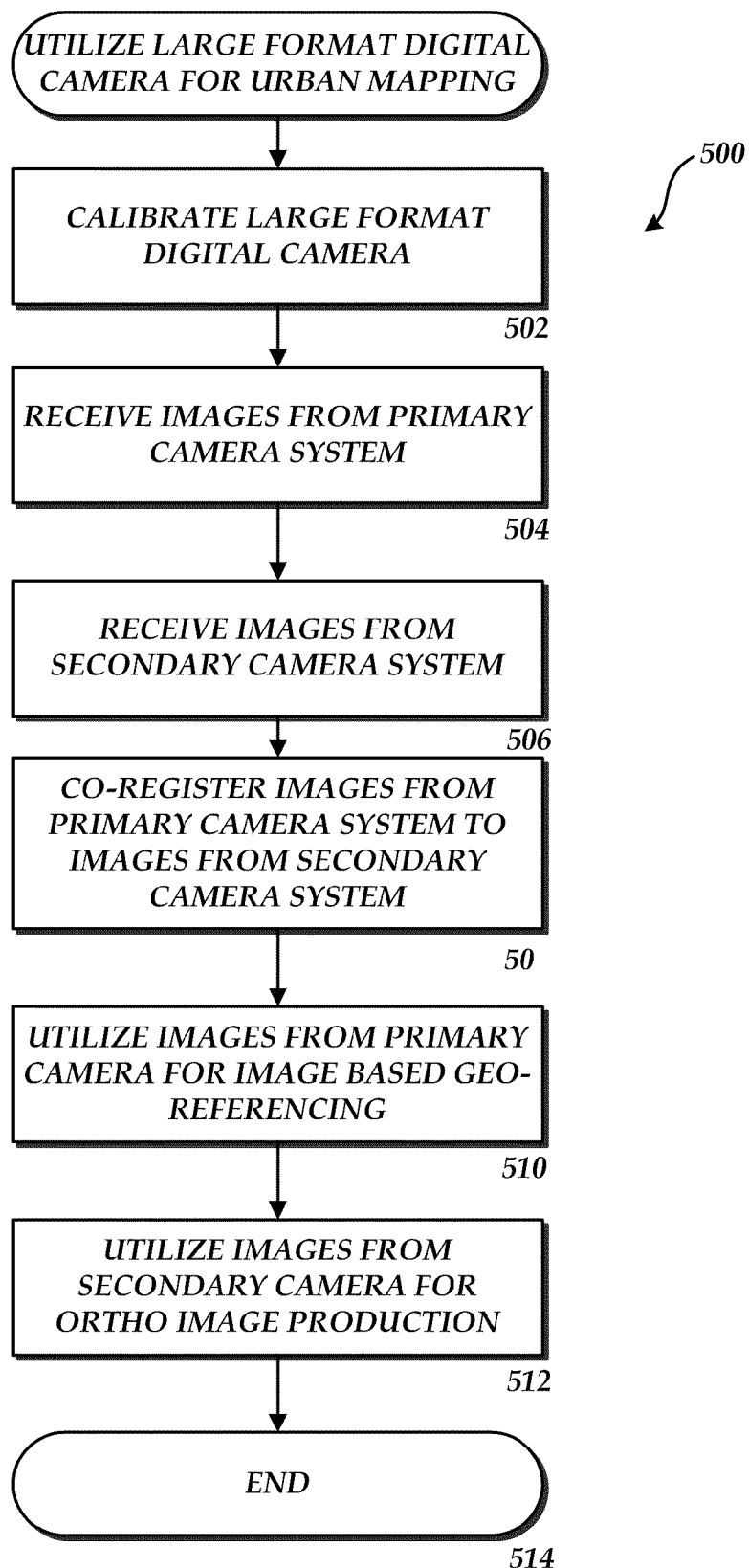
FIG. 5 is a flow diagram showing one illustrative process presented herein for the airborne optical registration of urban areas using a large format digital camera having multiple optical systems and detector arrays provided in one embodiment presented herein.

Referring now to FIG. 5 additional details will be provided regarding the embodiments presented herein for a large format digital camera 100 having multiple optical systems and detector arrays. In particular, FIG. 5 is a flow diagram showing a routine 500 that illustrates one process presented herein for the airborne optical registration of urban areas using the large format digital camera 100 described above.

The routine 500 begins at operation 502, where the large format digital camera 100 is calibrated. As discussed above, the large format digital camera 100 may be calibrated using a calibration object such that the footprint of images produced by the secondary camera system 104B overlap the central portion of the footprint of images produced by the primary camera system 104A. As also discussed above, the large format digital camera 100 may be installed in an aircraft and utilized to capture ground images as the aircraft is flown along a well-defined flight line. Such images may be captured and stored in an appropriate digital storage device integrated with or external to the large format digital camera 100.

From operation 502, the routine 500 proceeds to operation 504 where panchromatic image files 114 are received from the primary camera system 104A. The routine then proceeds to operation 506, where color image files 118 are received from the secondary camera system 104B. Once the images files have been received from both camera systems 104A-104B, the routine 500 proceeds to operation 508, where the image files 114 from the primary camera system 104A are co-registered with the image files 118 from the secondary camera system 104B.

From operation 508, the routine 500 proceeds to operation 510, where the image files 114 from the primary camera system 104A are utilized in a photogrammetric workflow that includes image-based georeferencing and digital surface modeling. From operation 510, the routine 500 proceeds to operation 512, where the image files 118 from the secondary camera system 104B are utilized for ortho image production. The routine 500 proceeds from operation 512 to operation 514, where it ends.

Based on the foregoing, it should be appreciated that a large format digital camera 100 having multiple optical systems and detector arrays has been disclosed herein that is suitable for use in the airborne optical registration of urban areas. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A large format framing camera, comprising:
a first camera system configured for collecting panchromatic image data, the first camera system comprising a first optical system having a first focal length; and
a second camera system configured for collecting color image data, the second camera system comprising a second optical system having a second focal length, and wherein the second focal length is longer than the first focal length,
wherein a radiometric resolution of the second camera system is greater than the radiometric resolution of the first camera system, and
wherein an image capture trigger for the second camera system being at a higher rate than an image capture trigger for the first camera system.

2. The large format camera of claim 1, wherein the first camera system further comprises an electro-optical detector array having a first resolution for collecting the panchromatic image data, wherein the second camera system further comprises an electro-optical detector array having a second resolution for collecting the color image data, and wherein the second resolution is greater than the first resolution.

3. The large format camera of claim 2, wherein the first camera system has a first footprint, wherein the second camera system has a second footprint, and wherein the second footprint is smaller than the first footprint.

4. The large format camera of claim 3, wherein the second footprint covers a center of the first footprint.

5. The large format camera of claim 4, wherein the large format camera is configured to output a first image comprising the panchromatic image data and a second image comprising the color image data.

6. The large format camera of claim 5, wherein the first camera system and the second camera system are mounted within a single housing.

7. The large format camera of claim 6, wherein the first camera system and the second camera system are configured to generate a sequence of consecutive first and second images, wherein consecutive first images overlap one another, consecutive second images overlap one another, and wherein the overlap of the first images is greater than the overlap of the second images.

8. The large format camera of claim 7, wherein the first images are used in a photogrammetric workflow that includes image-based geo-referencing and digital surface modeling.

9. The large format camera of claim 8, wherein the second images are used in a photogrammetric workflow that includes ortho-image production.

10. A large format framing camera, comprising:
a first camera system configured for collecting panchromatic image data, the first camera system comprising a first optical system having a first focal length and being configured output a first image comprising the panchromatic image data, the first image having a first footprint; and
a second camera system configured for collecting color image data, the second camera system comprising a second optical system having a second focal length and being configured to output a second image comprising the color image data, the second image having a second footprint, and wherein the second focal length is longer than the first focal length and the second footprint is smaller than the first footprint,
wherein an image capture trigger for the second camera system being at a higher rate than an image capture trigger for the first camera system.

11. The large format camera of claim 10, wherein the second footprint covers a center of the first footprint.

12. The large format camera of claim 11, wherein the first camera system and the second camera system are mounted within a single housing.

13. The large format camera of claim 12, wherein the first camera system further comprises an electro-optical detector array having a first resolution for collecting the panchromatic image data, wherein the second camera system further comprises an electro-optical detector array having a second resolution for collecting the color image data, and wherein the second resolution is greater than the first resolution.

14. The large format camera of claim 13, wherein the first camera system and the second camera system are configured to generate a sequence of consecutive first and second images, wherein consecutive first images overlap one another, consecutive second images overlap one another, and wherein the overlap of the first images is greater than the overlap of the second images.

15. A large format framing camera, comprising:
a housing;
a first camera system mounted within the housing and configured for collecting panchromatic image data, the first camera system comprising a first optical system having a first focal length and an electro-optical detector array having a first resolution for collecting the panchromatic image data; and
a second camera system mounted within the housing configured for collecting color image data, the second camera system comprising a second optical system having a second focal length and an electro-optical detector array having a second resolution for collecting the color image data, and wherein the second focal length is longer than the first focal length and the second resolution is greater than the first resolution,
the color image data collected by the second camera system being stitched to corresponding panchromatic image data collected by the first camera system based on a calibration object
wherein an image capture trigger for the second camera system being at a higher rate than an image capture trigger for the first camera system.

16. The large format camera of claim 15, wherein the first camera system has a first footprint, wherein the second camera system has a second footprint, wherein the second footprint is smaller than the first footprint, and wherein the second footprint covers a center of the first footprint.

17. The large format camera of claim 16, wherein the large format camera is configured to output a first image comprising the panchromatic image data and a second image comprising the color image data.

18. The large format camera of claim 17, wherein the first camera system is configured to generate a consecutive sequence of first images and the second camera system is configured to generate a consecutive sequence of second images, wherein consecutive first images overlap one another, consecutive second images overlap one another, and wherein the overlap of the first images is greater than the overlap of the second images.

19. The large format camera of claim 18, wherein the first images are used in a photogrammetric workflow that includes image-based geo-referencing and digital surface modeling and wherein the second images are suitable for ortho-image production.

* * * * *